(12) United States Patent
Zhang et al.

(10) Patent No.: US 12,356,422 B2
(45) Date of Patent: Jul. 8, 2025

(54) METHOD AND APPARATUS FOR DOWNLINK DATA RECEPTION

(71) Applicant: Lenovo (Beijing) Ltd., Beijing (CN)

(72) Inventors: Yu Zhang, Haidian District (CN); Haipeng Lei, Haidian District (CN); Alexander Golitschek Edler von Elbwart, Darmstadt (DE)

(73) Assignee: Lenovo (Beijing) Ltd., Beijing (CN)

( * ) Notice: Subject to any disclaimer, the term of this patent is extended or adjusted under 35 U.S.C. 154(b) by 445 days.

(21) Appl. No.: 17/783,566

(22) PCT Filed: Dec. 30, 2019

(86) PCT No.: PCT/CN2019/129949
§ 371 (c)(1),
(2) Date: Jun. 8, 2022

(87) PCT Pub. No.: WO2021/134223
PCT Pub. Date: Jul. 8, 2021

(65) Prior Publication Data
US 2023/0047505 A1    Feb. 16, 2023

(51) Int. Cl.
*H04W 72/23* (2023.01)
*H04W 16/28* (2009.01)
*H04W 72/0446* (2023.01)

(52) U.S. Cl.
CPC .......... *H04W 72/23* (2023.01); *H04W 16/28* (2013.01); *H04W 72/0446* (2013.01)

(58) Field of Classification Search
CPC .................................................. H04W 72/23
USPC ............................................................ 370/329
See application file for complete search history.

(56) References Cited

U.S. PATENT DOCUMENTS

| 9,883,496 B2 * | 1/2018 | Choi ..................... H04L 5/0032 |
| 2019/0020506 A1 | 1/2019 | Cheng et al. |
| 2019/0097874 A1 * | 3/2019 | Zhou ..................... H04W 76/27 |
| 2019/0254045 A1 * | 8/2019 | Sadiq ..................... H04W 72/12 |
| 2019/0306881 A1 | 10/2019 | Fakoorian et al. |

FOREIGN PATENT DOCUMENTS

| CN | 108781432 A | 11/2018 | |
| CN | 109565834 A | 4/2019 | |
| CN | 115053591 A * | 9/2022 | ........... H04L 1/0046 |

OTHER PUBLICATIONS

PCT/CN2019/129949 , "International Search Report and Written Opinion", PCT Application No. PCT/CN2019/129949, Aug. 24, 2020, 7 pages.

* cited by examiner

*Primary Examiner* — Sibte H Bukhari
(74) *Attorney, Agent, or Firm* — FIG. 1 Patents (57) ABSTRACT

The present application relates to a method and apparatus for downlink data reception. one embodiment of the subject application provides a method, comprising: determining one or more control resource sets from a plurality of control resource sets in response to first Downlink Control Information (DCI) being received in at least one of the one or more control resource sets; and detecting second DCI only in the determined one or more control resource sets within a time duration.

20 Claims, 8 Drawing Sheets

METHOD AND APPARATUS FOR DOWNLINK DATA RECEPTION

TECHNICAL FIELD

The subject application relates to the $3^{rd}$ Generation Partnership Project (3GPP) 5G new radio (NR), especially to a method and apparatus for downlink data reception.

BACKGROUND OF THE INVENTION

Base stations (BSs) and user equipment (UE) may operate in both licensed and unlicensed spectrum. In order to achieve fair coexistence with other wireless systems, a channel access procedure, for example, Listen Before Talk (LBT) which is based on energy detection, is required before a transmitter can start transmitting on a channel of unlicensed spectrum. Only when the LBT process generates a success result, the transmitter can start the transmission on the channel and occupy the channel up to a maximum channel occupancy time (MCOT); otherwise, the transmitter can't start the transmission and continue to performing LBT until the LBT process generates a success result.

Therefore, it is necessary for a UE to know the LBT related information.

SUMMARY

It is desirable to provide a solution to indicate the LBT related information to a UE for downlink data reception.

One embodiment of the subject application provides a method, comprising: determining one or more control resource sets from a plurality of control resource sets in response to first Downlink Control Information (DCI) being received in at least one of the one or more control resource sets; and detecting second DCI only in the determined one or more control resource sets within a time duration.

Another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method, comprising: determining one or more control resource sets from a plurality of control resource sets in response to first Downlink Control Information (DCI) being received in at least one of the one or more control resource sets; and detecting second DCI only in the determined one or more control resource sets within a time duration.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide a method and apparatus for downlink (DL) or uplink (UL) data transmission on unlicensed spectrum. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present disclosure are also applicable to similar technical problems.

Figure 1:
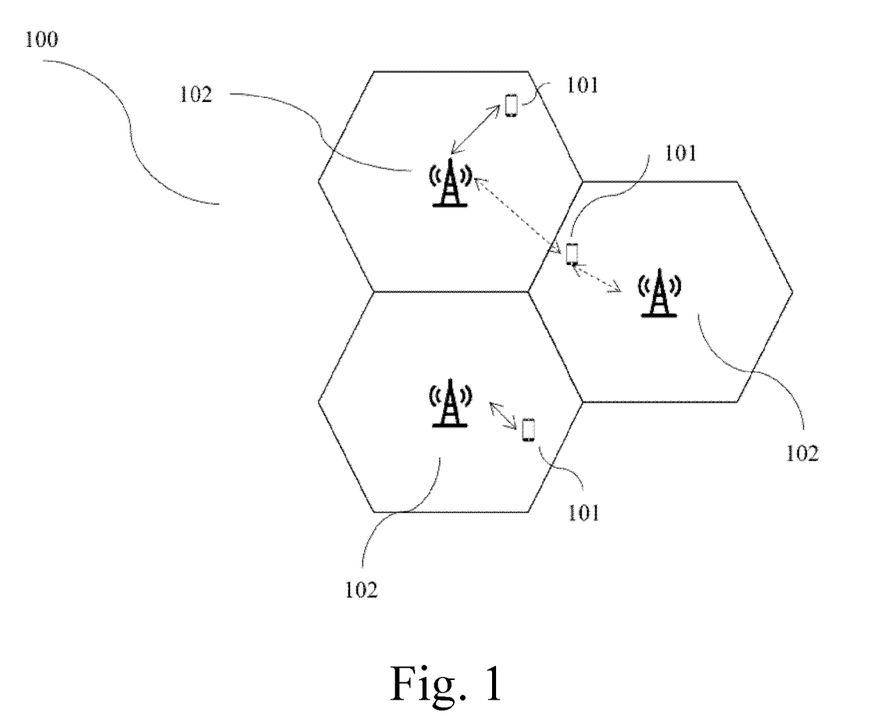
FIG. 1 illustrates a schematic diagram of a wireless communication system according to some embodiments of the subject disclosure.

FIG. 1 illustrates a wireless communication system 100 according to an embodiment of the present disclosure.

As shown in FIG. 1, the wireless communication system 100 includes UE 101 and BS 102. In particular, the wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile phone, a mobile station, a user, a terminal, a mobile terminal, a wireless terminal, a fixed terminal, a subscriber station, a user terminal, or any device described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or any device described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G NR of the 3GPP protocol, wherein the BSs 102 transmit data using an orthogonal frequency division multiplexing (OFDM) modulation scheme on the downlink and the UEs 101 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using 3GPP 5G protocols.

In order to achieve high link gain and wide coverage, beamforming is used on the millimeter wave (mmWave) band, for example, the frequency band around 60 GHz. The Omni-directional LBT used in License Assisted Access (LAA), Enhanced License Assisted Access (eLAA), Further Enhanced License Assisted Access (FeLAA), or NR-Unlicensed (NR-U) Frequency Range 1 (FR1, 450 MHz-6000 MHz), may cause some issues. For example, one of the biggest one is over protection.

Figure 2A:
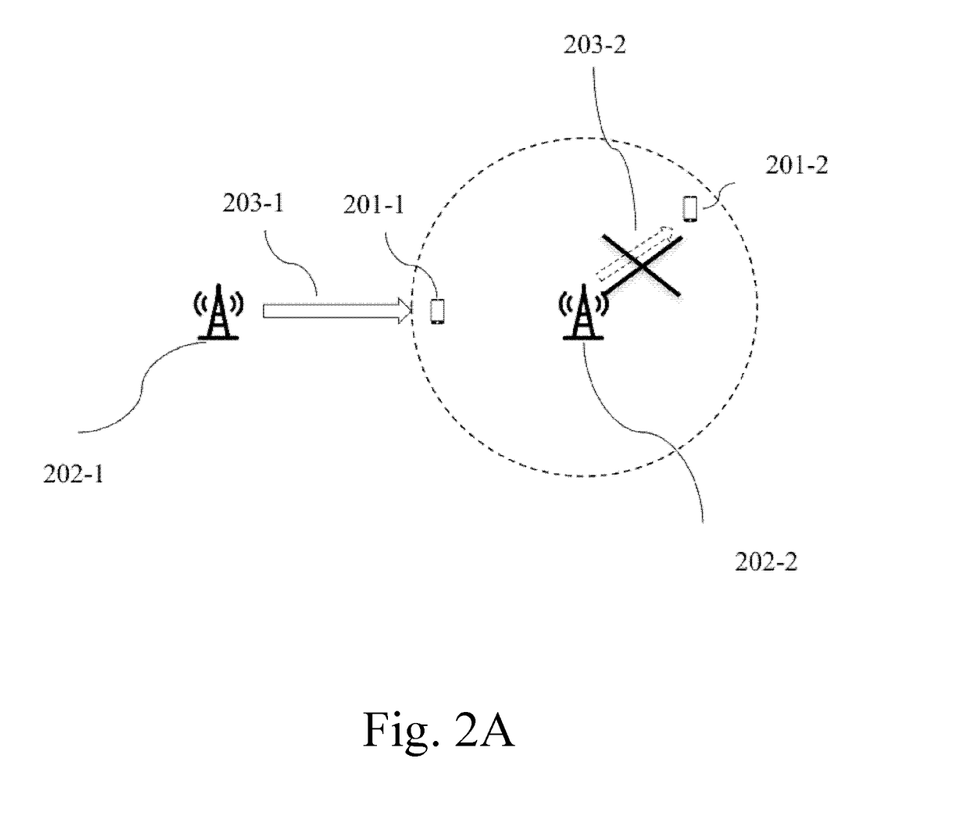
FIG. 2A illustrates an over protection scenario due to the Omni-directional LBT.

FIG. 2A illustrates an over protection scenario in NR-U due to the Omni-directional LBT. In FIG. 2A, the BS 202-1 is transmitting a transmission to the UE 201-1 using the transmission beam 203-1. Meanwhile, the BS 202-2 also intends to transmit a transmission to the UE 201-2, therefore, the BS 202-2 needs to perform the LBT procedure. The BS 202-2 performs the Omni-directional LBT, and senses the strong signal from the BS 202-1 to the UE 201-1. Therefore, the BS 202-2 determines the Omni-directional LBT procedure generates a failure result, and would not transmit the transmission to the UE 201-2, until the Omni-directional LBT procedure generates a success result.

In other words, the strong signal sensed from the beam direction, namely, the direction from the BS 202-1 to the UE 201-1, could block the transmissions of other nodes in other beam directions, for example, the beam direction from the BS 202-2 to the UE 201-2 in FIG. 2A, even if they can communicate at the same time without interfering each other. Accordingly, the Omni-directional LBT decreases the spatial multiplexing efficiency.

Figure 2B:
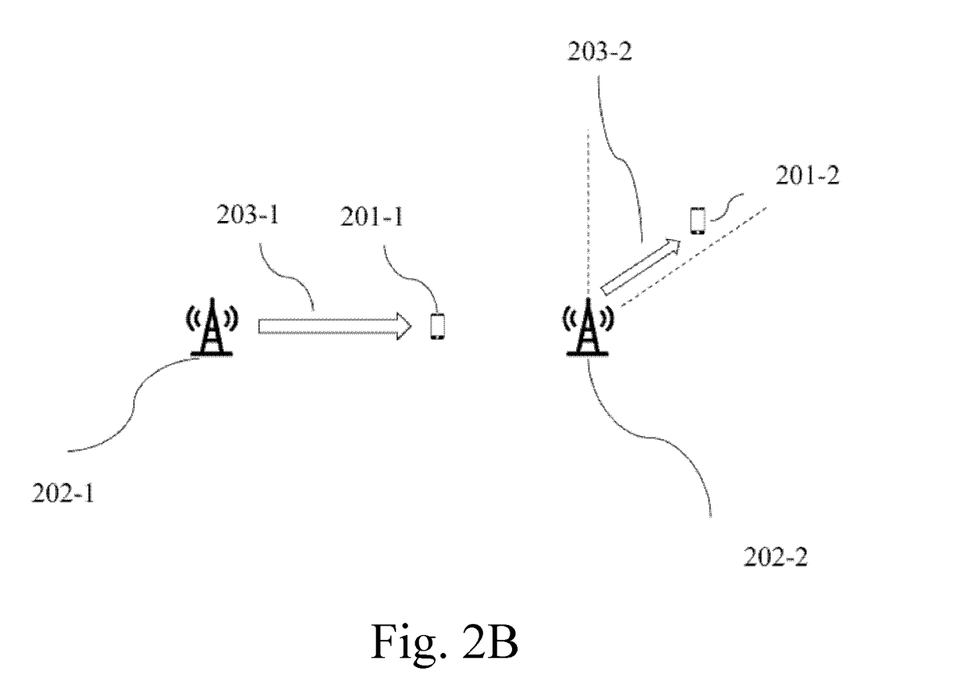
FIG. 2B illustrates a solution for the over protection scenario due to the Omni-directional LBT as illustrated in FIG. 2A.

FIG. 2B illustrates a solution for the over protection scenario due to the Omni-directional LBT as illustrated in FIG. 2A. This solution involves the directional LBT, which is a LBT with energy detection via narrow beam. In FIG. 2B, the BS 202-1 is transmitting data to the UE 201-1 using the beamforming technique. Meanwhile, the BS 202-2 intends to communicate with the UE 201-2, therefore, the BS 202-2 needs to perform the LBT procedure. Instead of Omni-directional LBT, the BS 202-2 performs the directional LBT in the region marked with dashed lines, and the directional LBT procedure generates a success result. Therefore, the BS 202-2 would transmit data to the UE 201-2 for a channel occupancy time (COT). Clearly, the method in FIG. 2B improves the spatial multiplexing efficiency.

Nevertheless, some modifications are needed in current NR specification when implementing directional LBT mechanism.

In order to receive the Physical Downlink Control Channel (PDCCH) transmitted from the BS, a UE needs to monitors a set of PDCCH candidates in one or more Control Resource Set (CORESET) on the active DL Bandwidth Part (BWP) on each activated serving cell configured with PDCCH monitoring according to corresponding search space sets. A PDCCH corresponds to a set of resource elements carrying Downlink Control Information (DCI) originating from higher layers. The UE can get the DCI by decoding the PDCCH.

In one embodiment, on the active Downlink BWP on each serving cell which is configured with PDCCH monitoring according to the corresponding search space set, the UE monitors a set of PDCCH candidates in one or more control resource sets. A CORESET is a time-frequency resource where PDCCH is transmitted and the size and location of a CORESET in the time-frequency domain is semi-statically configured by the BS. A search space which is also semi-statically configured by the BS, is a set of PDCCH candidates configured with periodicity and other parameters. A PDCCH candidate means a possible PDCCH transmission from the BS and the UE needs to monitor it. A UE can be configured with multiple search spaces. There can be multiple search spaces using the same CORESET and, as already described, there can be multiple CORESETs configured for a UE.

In NR, beam indication is supported. That is, a certain PDSCH and/or PDCCH transmission uses the same transmission beam as a configured reference signal, for example, Channel State Information-Reference Signal (CSI-RS) or Synchronization Signal Block (SS block). Beam indication is based on the configuration and downlink signaling of Transmission Configuration Indication (TCI) states. Each TCI state includes, among other things, information about a reference signal, e.g. a CSI-RS or an SS block. By associating a certain downlink transmission, for instance, PDCCH or PDSCH, with a certain TCI state, the BS informs the UE that it can assume that the downlink transmission is done using the same spatial filter as the reference signal associated with the TCI state. When monitoring possible PDCCH transmissions within a certain CORESET, the UE can assume that the PDCCH transmission uses the same spatial filter as the reference signal associated with the TCI state. In other words, if the UE has determined a suitable receiver-side beam direction for reception of the reference signal, the UE can assume that the same beam direction is suitable for reception of the PDCCH.

The BS configures a TCI state corresponding to a CORESET by high layer signalling, which indicates the UE that the Downlink Transmission (Tx) beam used for transmitting the PDCCH(s) in the CORESET. Therefore, the UE can select the corresponding Reception (Rx) beam. In the single Tx/Rx Point (TRP) scenario, up to three CORESETs could be configured within one BWP, and in multi-TRP scenario, up to five CORESETs could be configured within one BWP. Accordingly, the UE has to use three Rx beams or five Rx beams to monitor the PDCCH candidates transmitted from the BS.

The subject disclosure focuses on the single TRP scenario, that is, maximum three CORESETs could be configured within one BWP. The BS performs the directional LBT procedure to acquire the channel for a COT. As for multi-TRP scenario, the method described in this disclosure can be used when a UE receives PDCCH from one of the multiple TRPs.

Figure 3:
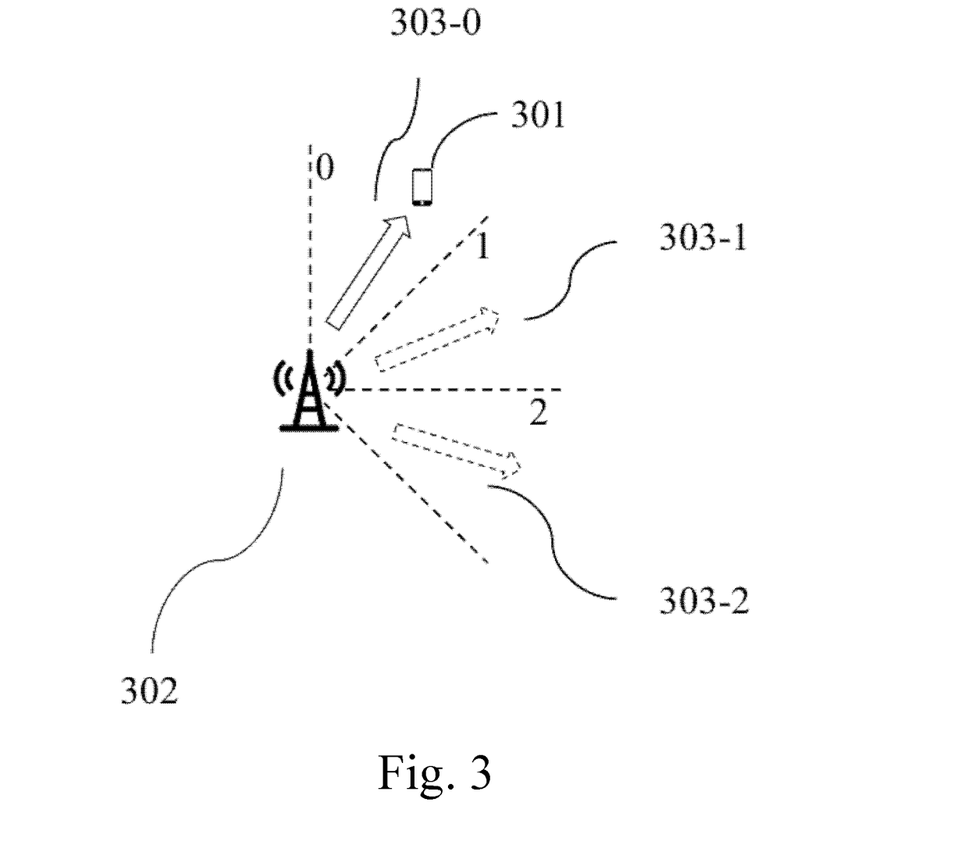
FIG. 3 illustrates a schematic diagram for downlink data reception according to some embodiments of the subject disclosure.

FIG. 3 illustrates a schematic diagram for downlink data reception according to some embodiments of the subject disclosure. There are 3 spatial regions in FIG. 3, which are numbered as 0, 1, and 2. Suppose beam 303-0 is located within spatial region 0, beam 303-1 is located within spatial region 1, and beam 303-2 is located within spatial region 2. The BS 302 performs directional LBT procedure in the spatial region 0, and acquires the channel for a COT. In the COT, the BS can use the Tx beam 303-0, which is inside the spatial region 0, but cannot use a Tx beam outside the spatial region 0, for example, the beam 303-1. If the BS wants to transmit another PDCCH transmission using the Tx beam 303-1 in spatial region 1, the BS needs to perform a new directional LBT for the spatial region 1, which means initializing a new COT. Thus, within a COT, the BS will not transmit PDCCH(s) in the CORESET whose related Tx beam is outside the current spatial region. Correspondingly, it is unnecessary for the UE to continue monitoring the PDCCH candidates in all the CORESETs within the COT. It should be noted that the subject disclosure has no intention of limiting the size or the shapes of the directional LBT related spatial region.

Accordingly, it is desirable to provide a solution for the UE to stop monitoring the PDCCH candidates in all the CORESETs within the COT when the BS only transmits PDCCH(s) in one or more CORESETs.

In the subject disclosure, when a BS performs a directional LBT procedure, and occupies a COT after the success result generated by the directional LBT procedure, the BS would transmit a Group Common PDCCH (GC-PDCCH). The GC-PDCCH has a field which indicates the COT duration. After receiving the GC-PDCCH, the UE knows the COT duration. Alternatively, if the UE does not know the COT duration, for example, the UE may not be configured to monitor a GC-PDCCH or the GC-PDCCH does not indicate the COT duration information, the UE can start a timer with a predetermined duration. Alternatively, the COT duration information may be indicated in other PDCCH, for example, UE-specific PDCCH.

In a preferred embodiment, when the UE has detected any PDCCH in one of the configured CORESETs of a cell, the UE will only monitor PDCCH candidates in the CORESETs of the same cell with the same TCI state, and not monitor PDCCH candidates in the CORESETs of the same cell with different TCI states until the end of the COT or the expiry of the timer of the same cell.

For example, in FIG. 3, the BS 302 performs directional LBT procedure in the spatial region 0, and acquires the channel for a COT. The UE 301 is configured with three CORESESTs, for example, CORESET 0, CORESET 1, and CORESET 2. The TCI state 0 which indicates beam 303-0, TCI state 1 which indicates beam 303-1, and TCI state 2 which indicates beam 303-2, are assigned to the three CORESESTs respectively. The UE 301 detects a GC-PDCCH in CORESET 0, in which a field indicates the COT duration, the until the COT duration is up, the UE 301 will only monitor PDCCH candidates in CORESET 0, and not monitor PDCCH candidates in CORESETs 1 and 2. The COT duration may also be indicated by other PDCCH, for example, the UE-specific PDCCH, or any other PDCCH.

The UE may be configured with two CORESESTs, for example, CORESET 0 and CORESET 1. The TCI state 0 which indicates beam 303-0, and TCI state 1 which indicates beam 303-1, are assigned to CORESET 0 and CORESET 1 respectively. The UE 301 detects a GC-PDCCH in CORESET 0, in which a field indicates the COT duration, then before the COT duration is up, the UE will only monitor PDCCH candidates in CORESET 0, and not monitor PDCCH candidates in CORESET 1.

In another embodiment, if the UE is configured with three CORESESTs, CORESET 0, CORESET 1, and CORESET 2. The TCI state 0 which indicates beam 303-0 is assigned to both CORESET 0 and CORESET 1, and the TCI state 1 which indicates beam 303-1 is assigned to CORESEST 2. Because CORESET 0 and CORESET 1 are assigned with the same TCI state, TCI state 0, which means the Tx beams are identical, it follows that the corresponding Rx beams are also identical, and the UE could monitor both the PDCCH candidates in CORESET 0 and CORESET 1 with the same Rx beam. The UE 301 detects a GC-PDCCH in CORESET 0, in which a field indicates the COT duration, the UE will only monitor PDCCH candidates in the CORESET group including CORESET 0 and CORESET 1, and not monitor PDCCH candidates in CORESET 2 until the end of the COT.

In yet another embodiment, the UE is configured with three CORESESTs, CORESET 0, CORESET 1, and CORESET 2, each CORESEST is assigned with the corresponding TCI state, TCI state 0, TCI state 1, and TCI state 2. Then the UE monitors a set of PDCCH candidates in the three CORESETs according to corresponding search space sets. Assuming that the UE detects a PDCCH in CORESET 0, for example, a UE specific PDCCH or a GC-PDCCH, however, the PDCCH does not indicate the COT duration. Under this condition, a timer or a predefined time limit is introduced. The predefined time limit may be in unit of slots, symbols, millisecond, nanosecond, etc.

Until the predefined time limit expires, the UE will only monitor PDCCH candidates in CORESET 0, and not monitor PDCCH candidates in CORESET 1 and CORESET 2. If the UE receives another PDCCH carrying a COT duration during before the predefined time limit expires, then there would be two time limits, 1, the predefined time limit counted by the timer, and 2, the COT indicated by the another PDCCH. Then before either time limit is up, the UE would only monitor PDCCH candidates in CORESET 0. Alternatively, the UE may only monitor PDCCH candidates in CORESET 0 until the first time is up, or only monitor PDCCH candidates in CORESET 0 until the second time is up.

Figure 4A:
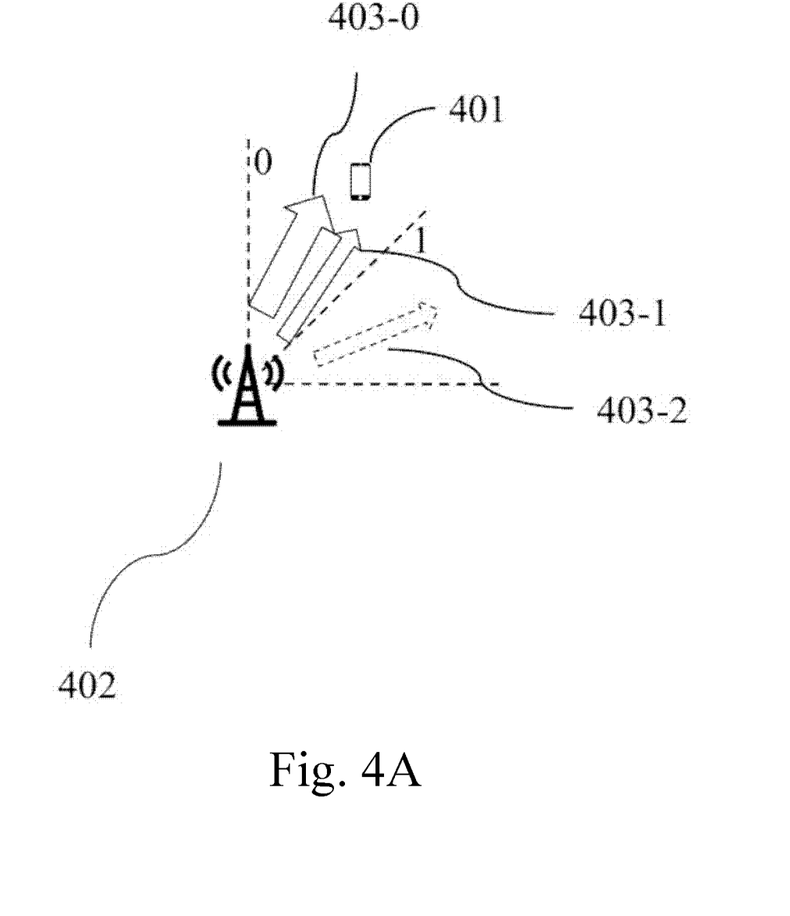
FIG. 4A illustrates another schematic diagram for downlink data reception according to some embodiments of the subject disclosure.

FIG. 4A illustrates another schematic diagram for downlink data reception according to some embodiments of the subject disclosure. In FIG. 4A, the UE 401 monitors a set of PDCCH candidates in one or more control resource sets on the active DL BWP on each activated serving cell configured with PDCCH monitoring according to corresponding search space sets. In this embodiment, a number of CORESETs with different TCI states can be configured as a CORESET group. The CORESETs with the same TCI state are always considered as a CORESET group. In FIG. 4A, the UE is configured with three CORESESTs, CORESET 0, CORESET 1, and CORESET 2. The TCI state 0 which indicates beam 403-0, TCI state 1 which indicates beam 403-1, and TCI 2 which indicates beam state 403-2, are assigned to the three CORESESTs respectively. According to this embodiment, CORESET 0 and CORESET 1 are configured as one CORESET group.

Figure 4B:
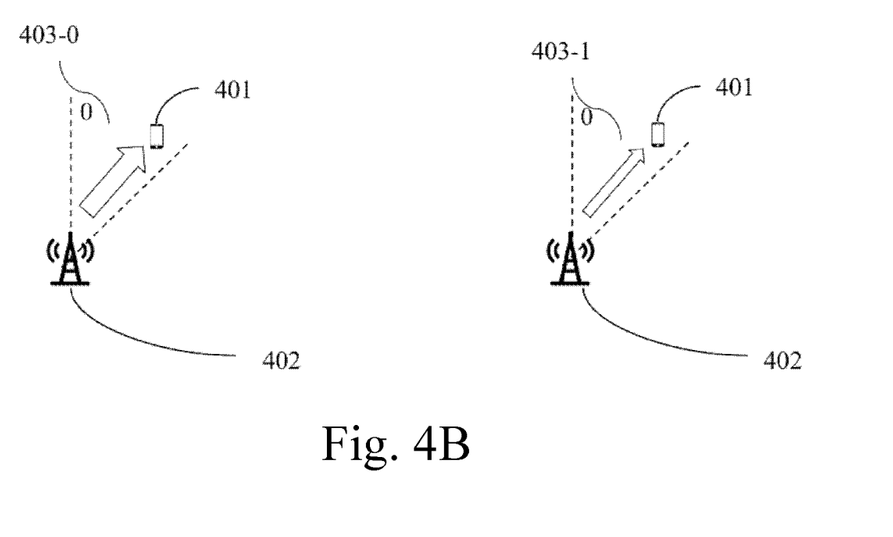
FIG. 4B illustrates yet another schematic diagram for downlink data reception according to some embodiments of the subject disclosure.

FIG. 4B illustrates yet another schematic diagram for downlink data reception according to some embodiments of the subject disclosure. In FIG. 4B, the beam 403-0 indicated by the TCI state 0 is broader than the beam 403-1 indicated by the TCI state 1, and the corresponding CORESET 0 and CORESET 1 are configured as one CORESET group.

There are many grouping manners of the CORESETs. For example, in FIG. 4A, the two beams 403-0 and 403-1 both belong to the region 0, and the corresponding CORESEST 0 and CORESEST 1 are configured as one CORESET group; in FIG. 4B, the two beams 403-0 and 403-1 intersect with each other, and the corresponding CORESEST 0 and CORESEST 1 are configured as one CORESET group. There may be other grouping manners, and the subject disclosure has no intention of limiting these manners.

When the UE has detected any PDCCH in a CORESET of a CORESET group of a cell, the UE will monitor PDCCH candidates in all the CORESETs which belong to the CORESET group, and not monitor PDCCH candidates not belonging to the CORESET group until the end of COT or the expiry of the timer of the same cell.

In FIG. 4A, the UE 401 is configured with 3 CORESESTs, CORESET 0, CORESET 1 and CORESET 2. The CORESET 0 is configured with a TCI state 0 with a beam 403-0, the CORESET 1 is configured with a TCI state 1 with a beam 403-1, and the CORESET 2 is configured with a TCI state 2 with a beam 403-2. The CORESET 0 and CORESET 1 belong to CORESET group 0, and CORESET 2 belongs to CORESET group 1.

Assuming that the UE detects a GC-PDCCH in CORESET 0, in which a field indicates the COT duration, that is, the UE detects a GC-PDCCH in a CORESET of CORESET group 0, and the GC-PDCCH indicates the COT duration, then the UE monitors the PDCCH candidates in each CORESET of the CORESET group 0, but does not monitor those in CORESET group 1 within the COT.

Alternatively, if the GC-PDCCH does not indicate the COT duration, a timer or a predefined time limit is introduced. The predefined time limit may be in unit of slots, symbols, millisecond, nanosecond, etc.

Assuming that the UE detects a PDCCH in CORESET 0, for example, a UE specific PDCCH or a GC-PDCCH, however, the PDCCH does not indicate the COT duration. Under this condition, the UE will only monitor PDCCH candidates in CORESET 0 and CORESET 1 which belong to the CORESET group 0 and stop monitoring PDCCH candidates in CORESET 2 until the predefined time limit expires. If the UE receives another PDCCH carrying a COT duration during before the predefined time limit expires, then there would be two time limits, 1, the predefined time limit counted by the timer, and 2, the COT indicated by the another PDCCH.

Then before either time limit is up, the UE would only monitor PDCCH candidates in CORESET 0 and CORESET 1 which belong to the CORESET group 0. Alternatively, the UE may only monitor PDCCH candidates in CORESET 0 and CORESET 1 until the first time is up, or only monitor PDCCH candidates in CORESET 0 and CORESET 1 until the second time is up.

Grouping the CORESETs allows the BS to switch CORESET within a COT. For example, in FIG. 4A, when the BS 402 perform directional LBT in the spatial 0 and occupies a COT, the BS may first transmits PDCCH in CORESET 0 using the beam 403-0, then transmits PDCCH in CORESET 1 using the beam 403-1 within the COT. Because CORESET 0 and CORESET 1 belong to the same CORESET group, the UE would monitor the PDCCH candidates in both CORESET 0 and CORESET 1 with the COT. Since the BS does not perform directional LBT in the spatial 1, the BS cannot transmits PDCCH in CORESET 2 using the beam 403-2, and the UE would not monitor the PDCCH candidates in CORESET 2 within the COT. Similarly, in FIG. 4B, the BS may switch from the broader beam 403-0 to the narrower beam 403-1 within the COT.

Figure 5:
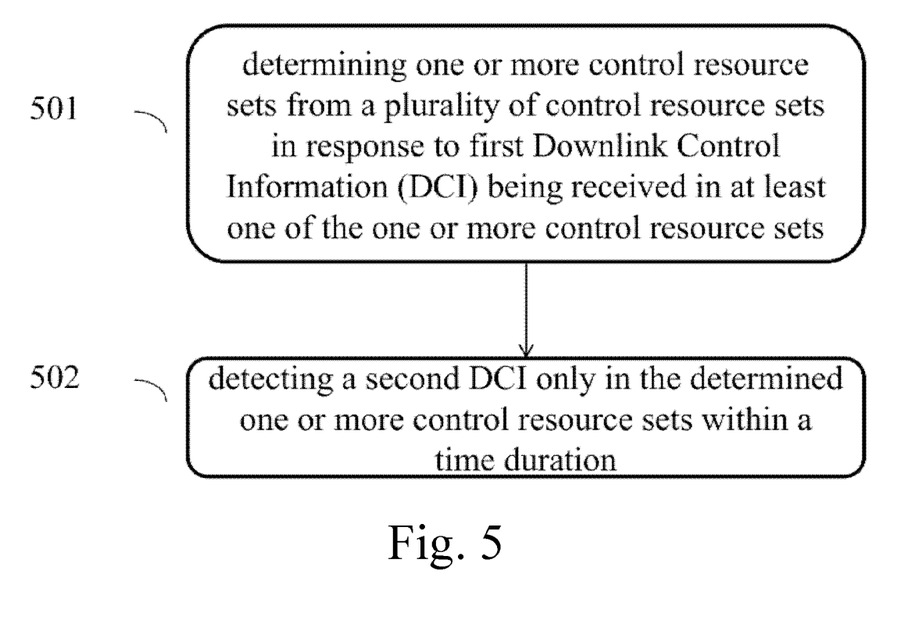
FIG. 5 illustrates a method performed by a UE for wireless communication according to some embodiments of the subject disclosure.

FIG. 5 illustrates a method performed by a UE for wireless communication according to some embodiments of the subject disclosure. In step 501, the UE (e.g., UE 101 as shown in FIG. 1) determines one or more control resource sets (CORESETs) from a plurality of control resource sets in response to first Downlink Control Information (DCI) being received in at least one of the one or more control resource sets, for example, the first DCI is the GC-PDCCH or the UE-specific PDCCH. In step 502, the UE detects second DCI only in the determined one or more control resource sets within a time duration, the second DCI may be any PDCCH.

In one embodiment, the first DCI and the second DCI are identical. For example, the first DCI and the second DCI may both be the UE-specific PDCCH.

In one embodiment, each CORESET of the plurality of CORESETs has a corresponding parameter for indicating beam information. For example, in FIG. 4A, CORESET 0 has a corresponding TCI state 0, which indicates the beam 403-0, CORESET 1 has a corresponding TCI state 1, which indicates the beam 403-1, and CORESET 2 has a corresponding TCI state 2, which indicates the beam 403-2. In particular, when two CORESETs are determined, the two CORESETs may have the same TCI state.

Alternatively, the TCI states for the determined control resource set is different from one another when multiple control resource sets are determined. For example, in FIG. 4A, the UE determines two CORESETs, CORESET 0 and CORESET 1, and the TCI states are TCI state 0 and TCI state 1 respectively. The two CORESETs belong to one CORESET group. It should be noted that if multiple CORESETs have the same TCI sate, then these multiple CORESETs belong to one CORESET group. Alternatively, the different CORESETs may be grouped according to the associated TCI states.

In one embodiment, the time duration is indicated by an indicator in the first DCI, or the second DCI. When the first DCI and the second DCI does not indicate the time duration, the UE determines the time duration with a timer.

Figure 6:
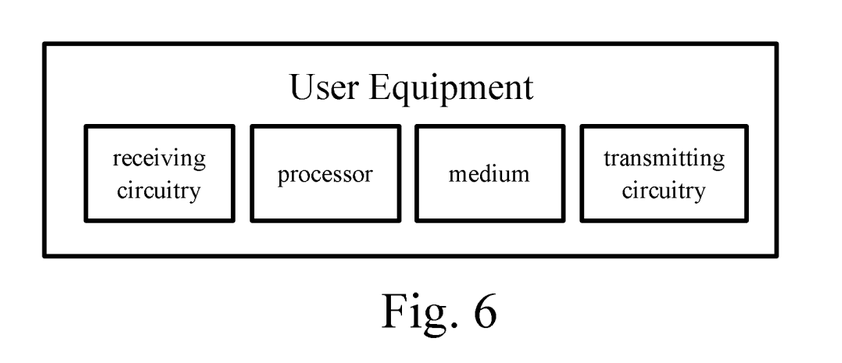
FIG. 6 illustrates a block diagram of a UE according to some embodiments of the subject disclosure.

FIG. 6 illustrates a block diagram of a UE according to some embodiments of the subject disclosure. The UE 101 may include a receiving circuitry, a processor, and a transmitting circuitry. In one embodiment, the UE 101 may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 5) with the receiving circuitry, the transmitting circuitry and the processor.

The processor may determines one or more control resource sets (CORESETs) from a plurality of control resource sets in response to first Downlink Control Information (DCI) being received in at least one of the one or more control resource sets, for example, the first DCI is the GC-PDCCH or the UE-specific PDCCH, and the processor further detects second DCI only in the determined one or more control resource sets within a time duration, the second DCI may be any PDCCH. The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:
    determining multiple control resource sets from a plurality of control resource sets in response to first downlink control information (DCI) being received in at least one of the multiple control resource sets, wherein the multiple control resource sets belong to a control resource set group; and
    detecting second DCI only in the multiple control resource sets within a time duration, wherein the time duration corresponds to the control resource set group and is indicated by a timer if the first DCI and the second DCI lack an indicator of the time duration.

2. The method of claim 1, wherein the first DCI and the second DCI are identical.

3. The method of claim 1, wherein each control resource set of the plurality of control resource sets has a corresponding parameter for indicating beam information.

4. The method of claim 3, wherein the corresponding parameter for each determined control resource set is the same when the multiple control resource sets are determined.

5. The method of claim 3, wherein the corresponding parameter for each determined control resource set is different from one another when the multiple control resource sets are determined.

6. The method of claim 5, wherein the corresponding parameter for each determined control resource set is the same with one another.

7. The method of claim 5, wherein the corresponding parameter for each determined control resource set is different from one another.

8. A user equipment (UE) for wireless communication, comprising:
    at least one memory; and
    at least one processor coupled with the at least one memory and configured to cause the UE to:
        determine multiple control resource sets from a plurality of control resource sets in response to first downlink control information (DCI) being received in at least one of the multiple control resource sets, wherein the multiple control resource sets belong to a control resource set group; and
        detect second DCI only in the multiple control resource sets within a time duration, wherein the time duration corresponds to the control resource set group and is indicated by a timer if the first DCI and the second DCI lack an indicator of the time duration.

9. The UE of claim 8, wherein the first DCI and the second DCI are identical.

10. The UE of claim 8, wherein each control resource set of the plurality of control resource sets has a corresponding parameter for indicating beam information.

11. The UE of claim 10, wherein the corresponding parameter for each determined control resource set is the same when the multiple control resource sets are determined.

12. The UE of claim 10, wherein the corresponding parameter for each determined control resource set is different from one another when the multiple control resource sets are determined.

13. The UE of claim 12, wherein the corresponding parameter for each determined control resource set is the same with one another.

14. The UE of claim 12, wherein the corresponding parameter for each determined control resource set is different from one another.

15. The UE of claim 8, wherein the time duration is indicated by an indicator in the first DCI.

16. The UE of claim 8, wherein the time duration is indicated by an indicator in the second DCI.

17. The UE of claim 8, wherein the time duration is indicated by an indicator in third DCI.

18. A processor for wireless communication, comprising:
    at least one controller coupled with at least one memory and configured to cause the processor to:
        determine multiple control resource sets from a plurality of control resource sets in response to first downlink control information (DCI) being received in at least one of the multiple control resource sets, wherein the multiple control resource sets belong to a control resource set group; and detect second DCI only in the multiple control resource sets within a time duration, wherein the time duration corresponds to the control resource set group and is indicated by a timer if the first DCI and the second DCI lack an indicator of the time duration.

19. The processor of claim 18, wherein the first DCI and the second DCI are identical.

20. The processor of claim 18, wherein each control resource set of the plurality of control resource sets has a corresponding parameter for indicating beam information.

\* \* \* \* \*